(12) United States Patent
Yuan et al.

(10) Patent No.: US 8,990,612 B2
(45) Date of Patent: Mar. 24, 2015

(54) RECOVERY OF A DOCUMENT SERVING ENVIRONMENT

(75) Inventors: Daniel Yuan, Sammamish, WA (US); Neil Sharman, Sammamish, WA (US); Jay Goyal, Bellevue, WA (US); Utkarsh Jain, Bellevue, WA (US); Vibhaakar Sharma, Remond, WA (US); Vinay Deshpande, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 659 days.

(21) Appl. No.: 13/082,912

(22) Filed: Apr. 8, 2011

(65) Prior Publication Data

US 2012/0260124 A1 Oct. 11, 2012

(51) Int. Cl.
G06F 11/00 (2006.01)
G06F 17/30 (2006.01)
G06F 11/16 (2006.01)
G06F 11/20 (2006.01)

(52) U.S. Cl.
CPC ...... *G06F 17/30011* (2013.01); *G06F 11/1658* (2013.01); *G06F 11/203* (2013.01); *G06F 11/2038* (2013.01); *G06F 11/2048* (2013.01)
USPC ............................................. 714/4.11; 714/2

(58) Field of Classification Search
CPC ........................ G06F 11/1658; G06F 17/30011
USPC .................... 714/4.11, 4.1, 25, 2, 11
See application file for complete search history.

(56) References Cited

U.S. PATENT DOCUMENTS

| 5,920,854 | A | 7/1999 | Kirsch et al. |
| 6,067,541 | A | 5/2000 | Raju et al. |
| 6,278,992 | B1 | 8/2001 | Curtis et al. |
| 6,360,220 | B1 | 3/2002 | Forin |
| 6,377,996 | B1 * | 4/2002 | Lumelsky et al. ............ 709/231 |
| 6,516,337 | B1 | 2/2003 | Tripp et al. |
| 6,606,639 | B2 | 8/2003 | Jacobson et al. |
| 6,675,205 | B2 | 1/2004 | Meadway et al. |
| 6,823,492 | B1 | 11/2004 | Ambroziak |
| 6,850,935 | B1 | 2/2005 | Ponte |
| 7,165,071 | B2 | 1/2007 | Fanning et al. |
| 7,293,016 | B1 | 11/2007 | Shakib et al. |
| 7,305,613 | B2 | 12/2007 | Oezgen |

(Continued)

OTHER PUBLICATIONS

Chu, et al., "Optimizing Data Aggregation for Cluster-based Internet Services", In Proceedings of the ninth ACM SIGPLAN Symposium on Principles and Practice of Parallel Programming, vol. 38, Issue 10, Oct. 2003, 12 Pages.

(Continued)

*Primary Examiner* — Sarai Butler
(74) *Attorney, Agent, or Firm* — Dave Ream; David Andrews; Micky Minhas

(57) ABSTRACT

Methods and systems for quickly serving documents are provided. Documents may be served to users, for example, in response to search query inputs. Documents may be individually communicated to a document server individually prior to batching the documents. In such a real-time serving system, serving components may fail. To ensure real-time serving despite the failure, spares are utilized to replace the failing serving components such that the spare can immediately begin receiving documents. The spare can also be synchronized with other serving components to obtain the memory of the failing serving component prior to the failure.

20 Claims, 13 Drawing Sheets

(56) References Cited

U.S. PATENT DOCUMENTS

| | | | |
|---|---|---|---|
| 7,392,423 | B2 | 6/2008 | Henrickson |
| 7,395,263 | B2 | 7/2008 | McKenney |
| 7,546,321 | B2 | 6/2009 | Uppala |
| 7,693,813 | B1 | 4/2010 | Cao et al. |
| 8,402,032 | B1 | 3/2013 | Brunsman et al. |
| 2006/0036614 | A1 | 2/2006 | Simske |
| 2006/0069672 | A1 | 3/2006 | Maloney et al. |
| 2006/0123010 | A1 | 6/2006 | Landry et al. |
| 2006/0149826 | A1 | 7/2006 | Rooney |
| 2006/0294086 | A1 | 12/2006 | Rose et al. |
| 2009/0138472 | A1 | 5/2009 | MacLean |
| 2009/0254523 | A1 | 10/2009 | Lang et al. |
| 2010/0042584 | A1 | 2/2010 | Shavit et al. |
| 2010/0094870 | A1 | 4/2010 | Narang et al. |
| 2010/0115327 | A1* | 5/2010 | Lee .................................. 714/4 |
| 2010/0205160 | A1 | 8/2010 | Kumar et al. |
| 2010/0205476 | A1* | 8/2010 | Burgoyne et al. ................. 714/2 |
| 2011/0035748 | A1 | 2/2011 | Hamada et al. |

OTHER PUBLICATIONS

Perez, Sarah, "Bing Gets All Twittlery", Retrieved on Jan. 12, 2011.

Perez, Sarah, "Looking Forward to Viveri: An Experimental Search Site", Retrieved on Jan. 12, 2011, available at: http://chanel9.mscln.com/Blogs/coolstuff/Looking-Forward-to-Virveri-An-Experimental-Search-Site.

Singh, Apeksha, "Twitter Search is now Powered by Lucene", Retrieved on Jan. 12, 2011, available at http://www.bofskool.com/geeks/twitter-search-now-powered-lucene#.

Nareddy, Krishna, "Indexing with Microsoft Index Server", Published on Jan. 30, 1998, available at http://msdn.microsoft.com/en-us/library/dd582937%28v-office.11%29.aspx.

Chu, et al., "Optimizing Data Aggregatio for Cluster-based Internet Services", In Proceedings of the ninth ACM SIGPLAN Symposium on Principles and Practice of Parallel Programming, vol. 38, Issue 10, Oct. 2003, 12 pages.

Office Action regarding U.S. Appl. No. 13/082,997, dated Nov. 6, 2012, 20 pages.

Final Office Action regarding U.S. Appl. No. 13/082,997, dated Mar. 15, 2013, 22 pages.

Non-Final Office Action dated Nov. 13, 2013 re U.S. Appl. No. 13/082,997, 39 pgs.

Non-Final Office Action dated Dec. 4, 2013 re U.S. Appl. No. 13/082,990, 40 pgs.

Final Office Action dated Apr. 3, 2014 re U.S. Appl. No. 13/082,990, 35 pgs.

Non-Final Office Action dated May 21, 2014 in U.S. Appl. No. 13/082,997, 22 pages.

Non-Final Office Action dated Aug. 28, 2014 in U.S. Appl. No. 13/082,990, 27 pages.

Final Office Action dated Sep. 24, 2014 in U.S. Appl. No. 13/082,997, 26 pages.

* cited by examiner

RECOVERY OF A DOCUMENT SERVING ENVIRONMENT

CROSS-REFERENCE TO RELATED APPLICATIONS

This application is related by subject matter to the inventions disclosed in the following commonly assigned applications filed on even date herewith: U.S. application Ser. No. 13/082,990, entitled "Receiving Individual Documents to Serve"; and U.S. application Ser. No. 13/082,997, entitled "Lock-Free Indexing of Documents."

BACKGROUND

Document serving includes a certain amount of latency in serving after receiving a document. Documents are typically processed for serving and then wait to be batched with other documents before the documents may be served. Batching, as used herein, refers generally to grouping a plurality of documents together to communicate the group of documents to be served as a group. For instance, a document received is processed and then batched, or grouped, with a plurality of other documents for serving. Typically, documents are batched every 15-30 minutes as the batching process is time-consuming. Accordingly, documents are only available to be served 15-30 minutes after they are received. In turn, documents are generally received for a minimum of fifteen minutes before they are available to a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, quickly serving documents. Documents may be served to users, for example, in response to search query inputs. Documents may be individually received for serving before batching is complete. By avoiding the wait time for batching to be completed, it is possible to individually serve a document less than a second from when it was received. Additionally, replacement document servers may be running in the background such that, upon a failure, a failed document server may be immediately replaced without interrupting document serving.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
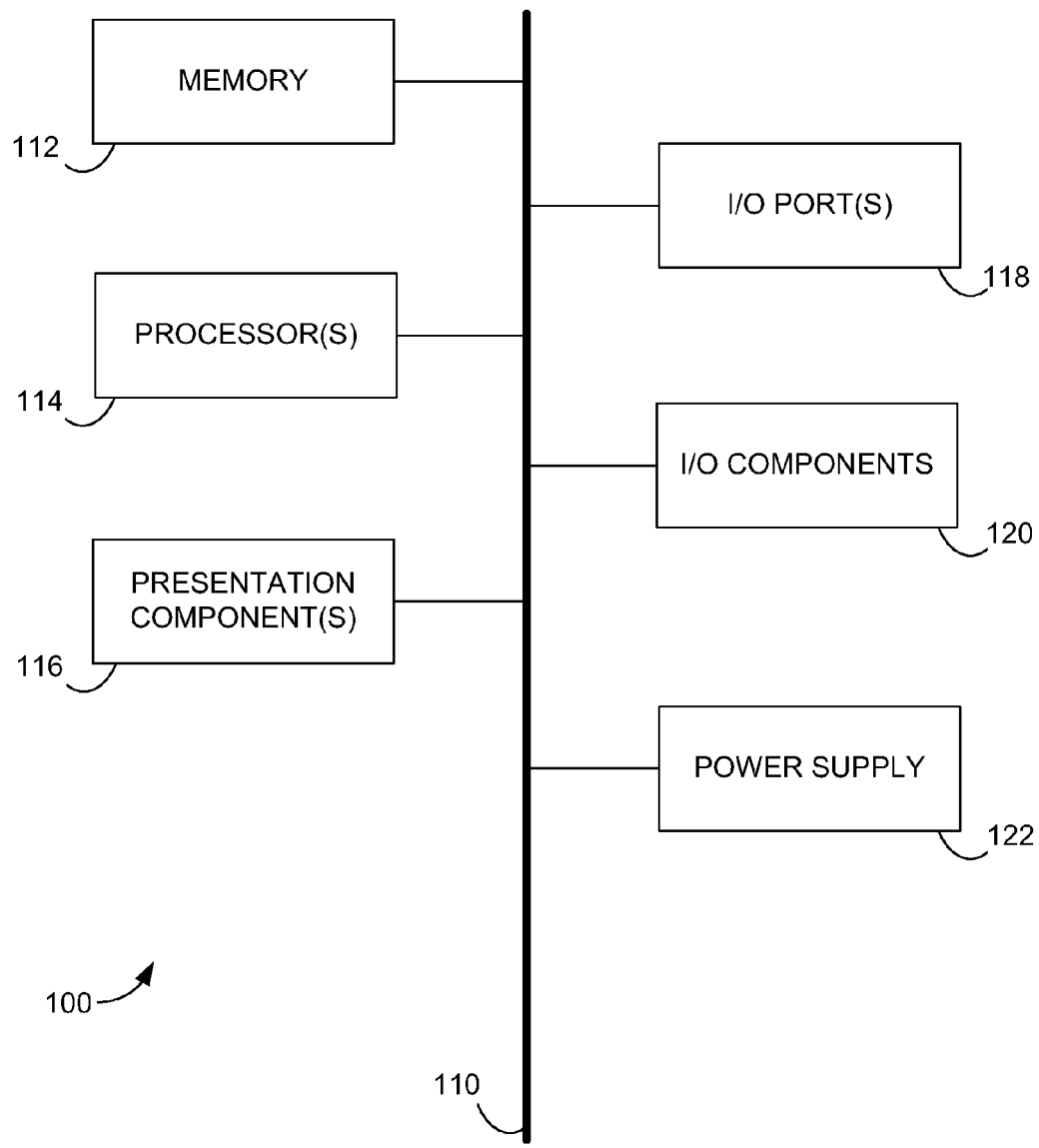
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, quickly serving documents. Documents may be served to users, for example, in response to search query inputs. Documents may be received by a document server and may be served before batching is completed. By serving documents before batching is completed, a wait time associated with batching is avoided and the document may then be individually served to a user less than a second from when it is received. Additionally, replacement document servers may be running in the background such that, upon a failure, a failed document server may be immediately replaced without interrupting document serving.

Accordingly, one embodiment of the present invention is directed to one or more computer storage media storing computer-useable instructions that, when used by one or more computing devices, cause the one or more computing devices to perform a method for quickly serving documents. The method comprises identifying a first document server of a plurality of document servers associated with a document distributor. The document distributor receives individual documents to communicate to each document server of the plurality of document servers. It is identified that the first document server is failing such that it is not receiving individual documents from the document distributor. An instruction is communicated to each of the plurality of document servers remaining after the first document server failed to record data accumulation. The first document server is replaced with a second document server and synchronized with each of the plurality of document servers such that they are identical.

Another embodiment of the present invention is directed to one or more computer storage media storing computer-useable instructions that, when used by one or more computing devices, cause the one or more computing devices to perform a method for quickly serving documents. The method comprises identifying a current load of an index unit associated with a document distributor in a first layout. A current load of the index unit is a number of individual documents received by the index unit. The index unit may include one or more document servers associated with the document distributor. An indication is received that a total load of the index unit is increasing. A second layout is created that includes at least one additional index unit compared to the first layout. Data associated with the first layout is transferred to the second layout until the first layout has transferred all data associated therewith and the second layout is identified as a primary layout such that all data is communicated directly to the second layout.

In yet another embodiment, the present invention is directed a method for quickly serving documents. An individual document is received that is available from a document provider. The individual document is communicated to a plurality of document servers associated with the document distributor. It is identified that a first document server of the plurality of document servers is failing. A sequence point is identified as a time at which the first document server failed and was no longer receiving documents. The failing document server's responsibilities are reassigned to a second document server such that any documents received after the sequence point are received by the second document server and the second document server is updated such that it is identical to each document server in the plurality of document servers.

Having briefly described an overview of embodiments of the present invention, an exemplary operating environment in which embodiments of the present invention may be implemented is described below in order to provide a general context for various aspects of the present invention. Referring initially to FIG. 1 in particular, a block diagram illustrating an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," and the like, as all are contemplated within the scope of FIG. 1 and reference to "computing device."

The computing device 100 typically includes a variety of computer-readable media. Computer-readable media can be any available media capable of being accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O component(s) 120, some of which may be built in. Illustrative components include a microphone, joystick, game pad, satellite dish, scanner, printer, wireless device, and the like.

Figure 2:
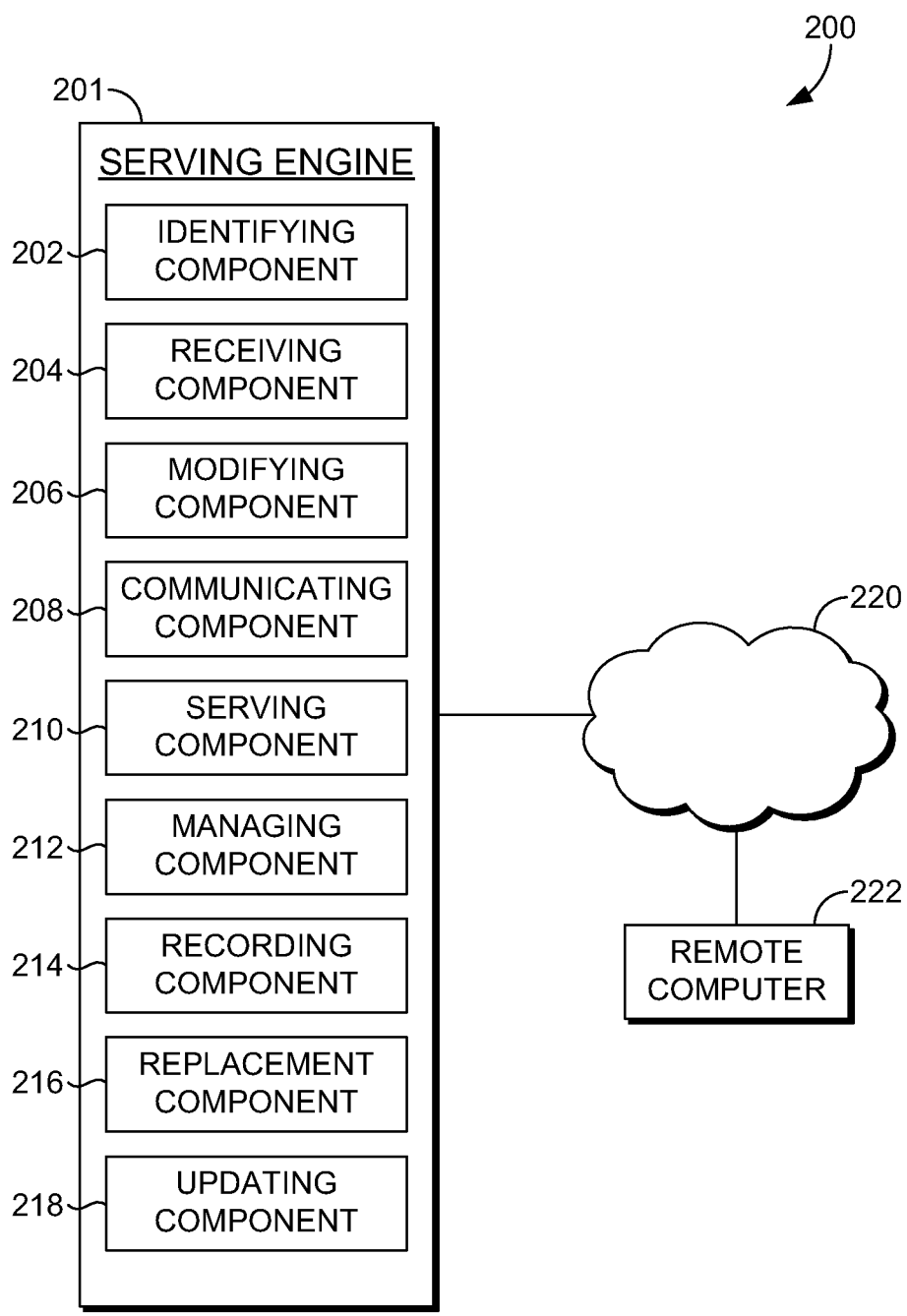
FIG. 2 is a block diagram of an exemplary computing system in which embodiments of the invention may be employed.

As indicated previously, embodiments of the present invention are directed to quickly serving documents. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a serving engine 201, a network 220 and a remote computing device 222. The remote computing device 222 may include any type of computing device, such as the computing device 100 described with reference to FIG. 1, for example. The serving engine 201 may take the form of a dedicated device for performing the functions described below, may be integrated into, e.g., the remote computing device 222, a network access device, a search engine, or the like, or any combination thereof. The components of the computing system 200 may communicate with each other via the network 220, which may include, without limitation, one or more local area networks (LANs) and/or wide area networks (WANs). Such networking environments are commonplace in offices, enterprise-wide computer networks, intranets and the Internet. It should be understood that any number of personal devices and serving engines may be employed in the computing system 200 within the scope of embodiments of the present invention. Each may comprise a single device/interface or multiple devices/interfaces cooperating in a distributed environment. For instance, the serving engine 201 may comprise multiple devices and/or modules arranged in a distributed environment that collectively provide the functionality of the serving engine 201 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the serving engine 201, as an Internet-based service, or as a module inside a search engine. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the serving engine 201 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which documents are quickly served to users. As will be described in further detail below, embodiments of the present invention serve individual documents to users prior to completion of a batching process such that documents are not required to be grouped together for serving.

The serving engine 201 is configured to quickly serve individual documents to users at, for example, the remote computing device 222. Documents, as used herein, refer generally to any web document including, but not limited to, websites, web pages, and the like. In an embodiment, a document is any document that may be served in response to a search query input. For example, assume that a news provider uploads a new article to their website. The new article is a document.

The serving engine 201 includes an identifying component 202, a receiving component 204, a modifying component 206, a communicating component 208, a serving component 210, a managing component 212, a recording component 214, a replacement component 216, and an updating component 218.

The identifying component 202 is configured to identify documents that are available from a document provider. A document provider, as used herein, refers generally to any entity that provides a document. For instance, in the above example, the news provider that uploaded the new article is a document provider. The identifying component 202 may identify documents by "crawling" through resources such as, for example, websites of document providers. In other words, the identifying component 202 looks for new documents. Alternatively, documents may be identified as a result of a document provider streaming the document.

The receiving component 204 is configured to individually receive one or more documents. The receiving component 204 may also be configured to associate each individual document with a document identifier. Each document received at the receiving component 204 may already be associated with a first document identifier provided by, for example, the document provider. The receiving component 204 may be configured to assign a second document identifier to the document such that documents may be modified efficiently. Document modification includes, but is not limited to, adding a new document, replacing an existing document, deleting an existing document, and the like, and will be discussed in further detail below. In embodiments, an individual document is modified at its source (e.g., by a document provider) such that a document index requires updating (e.g., deleting the document from the index, replacing the document in the index, etc.).

The modifying component 206 is configured to modify documents based on an indication from the document provider. By way of example only, assume that a document provider has indicated it wishes to replace an existing individual document. The indication may include the first document identifier associated with the individual document to be replaced.

The modifying component 206 may identify the first identifier associated with the individual document and map the first identifier to the second identifier associated with the individual document. This enables a document provider to provide the first identifier to identify the document to be replaced without replacing an entire batch of documents.

Once the first document identifier is mapped to the second document identifier, the second document identifier may be removed from a list of document identifiers that are associated with documents available to serve and added to a "deleted" list. A document that is replacing the original document may be associated with a third document identifier such that the serving engine 201 may easily identify that the document has been replaced and which identifier is associated with the replacement document.

In embodiments, a processing component (not shown) may be included in the system 200 to process and prepare documents for serving. This may be performed prior to receiving a document at the receiving component 204, subsequent to receiving a document at the receiving component 204, or the like. Processing may include document formatting or any other modifications that may be desired before serving a document.

The communicating component 208 is configured to communicate documents to the serving component 210. The documents may be received, for example, at the receiving component 204. In embodiments, the receiving component 204 may communicate the documents to the serving component 210 such that a communicating component is not present in the system 200.

The serving component 210 is configured to individually receive documents from, for example, the receiving component 204, the communicating component 208, or the like. The serving component 210 may receive documents to individually serve to a user prior to completion of a batching process. As previously explained, batching is a process that groups documents together such that they are available for serving in a group rather than individually. Batching is time-consuming and increases latency in making documents available to users. The serving component 210 is configured to make documents available for individually serving prior to completion of a batching process such that the documents are served individually rather than in groups.

In embodiments, the serving engine 201 includes a plurality of serving components. Each serving component is associated with a single receiving component such that each serving component receives documents from the single receiving component. This ensures that each serving component receives the same documents in the same order from the same receiving component such that each serving component associated with a receiving component is identical. Such "single ownership" allows for consistent, low latency, real-time updates to each serving component. The identical serving components also allow for a query to be received and served by any serving component, as they are identical. Given the magnitude of search queries received, this provides decreased latency as more serving components are available to receive the same search query.

For example, a serving engine may include Receiving Component A and Receiving Component B. Receiving Component A may be associated with three serving components (e.g., Serving Component 1, Serving Component 2, and Serving Component 3) while Receiving Component B may be associated with three different serving components (e.g., Serving Component 4, Serving Component 5, and Serving Component 6). Serving Component 1, Serving Component 2, and Serving Component 3 are each associated with only Receiving Component A and are identical to one another as they receive the same documents from the same receiving component in the same order. Likewise, Serving Component 4, Serving Component 5, and Serving Component 6 are each associated with only Receiving Component B and are identical to one another as they, too, receive the same documents from the same receiving component in the same order.

The managing component 212 is configured to, essentially, manage the serving engine 201. The managing component 212 may, for example, track a number of queries received by the system 200, track a number of documents received, track a number of documents served, monitor performance of each component of the serving engine 201, or the like. In an embodiment, the managing component 212 is configured to identify when a receiving component and/or a serving component is failing. Once a serving component is failing, it is no longer receiving documents and/or is no longer serving documents. The managing component 212 is configured to communicate a notification of this failure to the recording component 214 and the replacement component 216.

The recording component 214 is configured to record data subsequent to a failure of a serving component. Each serving component may include a recording component or it may be a separate component associated with the serving component. Data accumulated subsequent to a failure of a serving component is referred to herein as data accumulation. This data accumulation is recorded so that a replacement serving component may acquire one or more documents communicated to each of the other serving components before a sequence point. A sequence point, as used herein, refers generally to a moment when a replacement serving component replaces a failing serving component such that one or more documents received prior to that point are not recorded to the replacement serving component. The sequence point indicates to a replacement serving component which documents must be acquired from other serving components.

Figure 3:
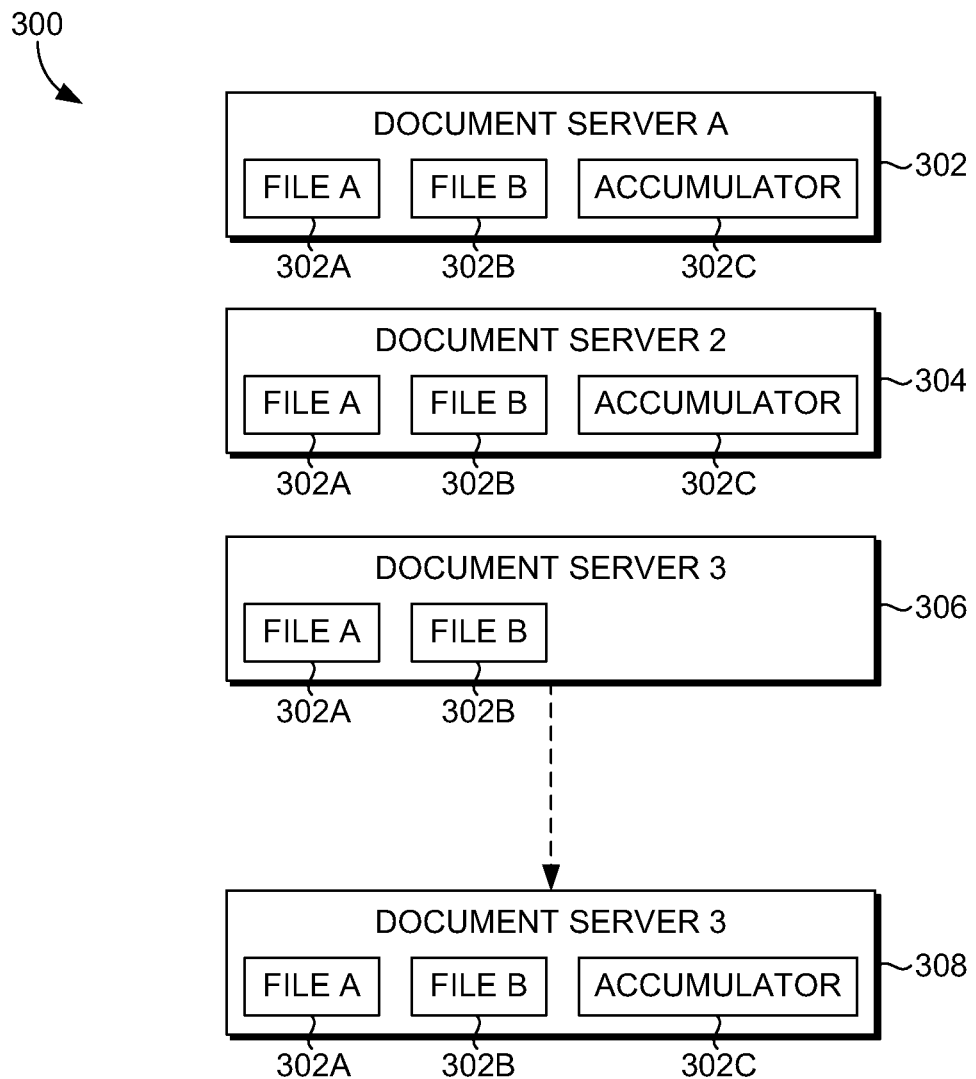
FIG. 3 is a block diagram of an exemplary replacement environment, in accordance with an embodiment of the present invention.

The replacement component 216 is configured to replace failing document servers with replacement document servers. For instance, FIG. 3 illustrates an exemplary failure environment 300. As indicated in FIG. 3, three document servers 302, 304, and 306 are operating. For purposes of this example, each document server is associated with the same receiving component, or document distributor. The document server 302, the document server 304, and the document server 306 each include a File A 302A and a File B 302B received after the sequence point. In this example, an original document server failed and the document server 306 is a replacement document server. The replacement document server 306 may receive documents as soon as it replaces the failing document server.

Once a serving component is identified as failing, the recording component 214 notifies the document servers 302 and 304 of the failure and instructs them to begin recording data accumulation. In response to the instruction, the document servers 302 and 304 create an accumulator 302C. The accumulator 302C may be configured to record data received by the document servers 302 and 304 including data received subsequent to the failure of the original document server but prior to the sequence point.

In FIG. 3, the document server 306 has replaced the original failed document server. As such, the document server 306 does not include the accumulator 302C and any data accumulated by the documents servers 302 and 304 is not yet recorded onto the document server 306. The document server 306 indicates that the document server 306 is receiving new documents as File A 302A and File B 302B are both recorded on the document server 306.

While receiving new documents, the document servers 302 and 304 are simultaneously creating an accumulator of data recorded prior to the sequence point. Once accumulated, the updating component 218 of FIG. 2 updates, or synchronizes the document server 306 such that it includes the accumulated data, as illustrated by the document server 308 that includes the accumulator 308C.

Returning to FIG. 2, the updating component 218 is configured to synchronize the document servers such that they are identical. The synchronization may occur as a result of a variety of methods. In an embodiment, the managing component 212 may access other document servers (e.g., document servers 302 and 304) to identify which of them include high-quality copies of the data accumulation based on predetermined criteria. Once identified, the managing component 212 may notify the replacement document server (e.g., document server 306) to obtain copies of the data accumulation from the various servers identified. As such, the replacement document server may obtain different portions of the data accumulation from different document servers.

Figure 4:
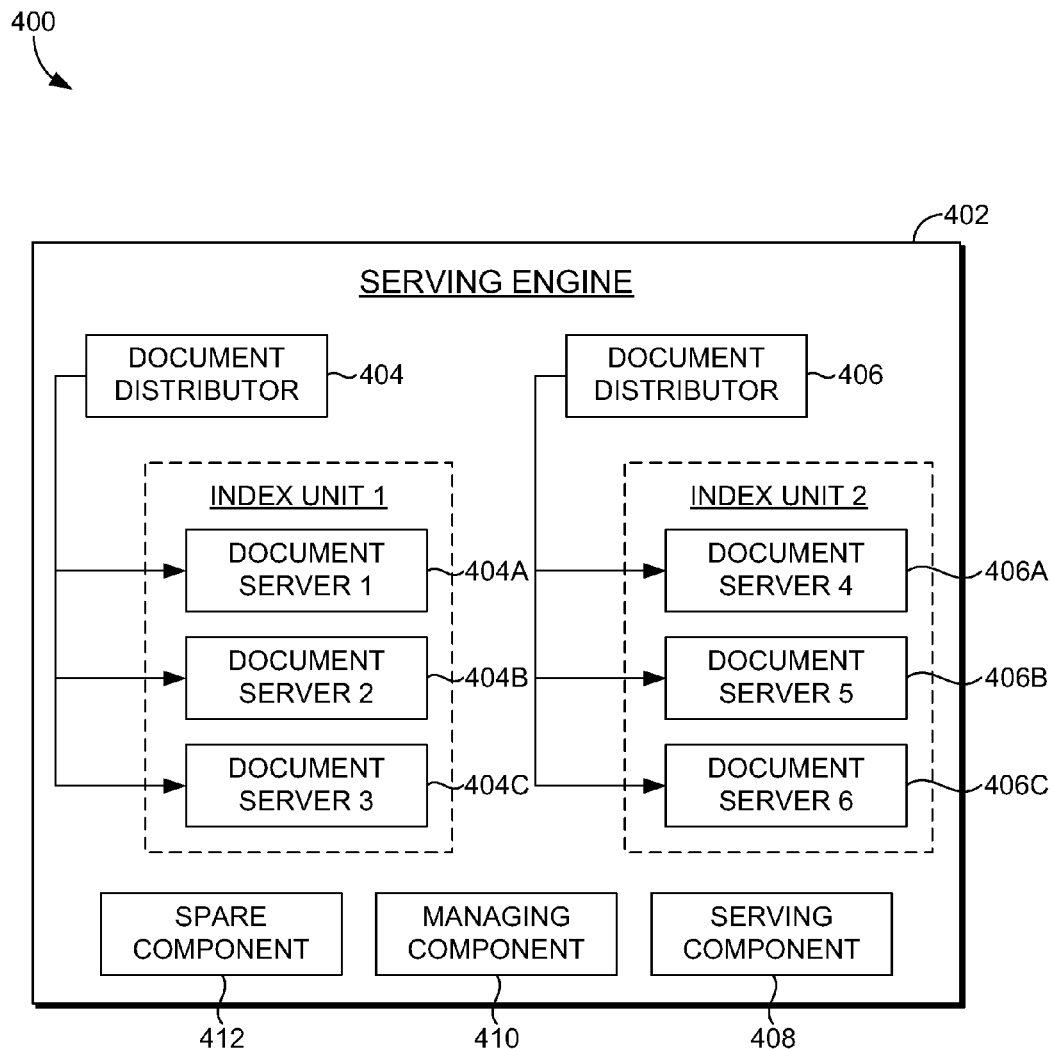
FIG. 4 is a block diagram of an exemplary serving engine, in accordance with embodiments of the present invention.

In application, utilizing an exemplary system 400 illustrated in FIG. 4, documents are individually received at the serving engine 402. The documents may be individually received at the document distributors 404 and 406. Each document distributor may be associated with a plurality of document servers. For instance, the document distributor 404 is associated with the document servers 404A, 404B, and 404C while the document distributor 406 is associated with the document servers 406A, 406B, and 406C. As described hereinabove, document servers are associated with a single document distributor such that each document server receives the same documents in the same sequence from the same document distributor. Thus, the document servers 404A, 404B, and 404C only receive documents from the document distributor 404 and the document servers 406A, 406B, and 406C only receive documents from the document distributor 406. A plurality of document servers associated with the same document distributor is referred to herein as an index unit. As such, the document servers 404A, 404B, and 404C form Index Unit 1 and the document servers 406A, 406B, and 406C form Index Unit 2.

Documents are individually received at the document distributors 404 and 406 and may be individually communicated to and individually received at the document servers 404A-406C. In embodiments, a document forwarder (not shown) is present to forward documents from a document distributor to each document server. The document forwarder may be configured to spread a document to each document server within an index unit resulting in decreased latency, a decreased load on the document distributors, and increased efficiency. In additional embodiments, the documents individually received at the document servers 404A-406C are directly served to a user.

In an embodiment, the document servers 404A-406C communicate individual documents to the serving component 408 to be served to a user prior to completion of batching. Throughout the serving process, the managing component 410 monitors performance of the serving engine 402. For example, as described hereinabove, the managing component 410 may identify that the document server 404C has failed and is no longer receiving documents. Upon identifying a failure, the managing component 410 may initiate recording of data accumulation and may replace the failing document server with a spare component 412. The managing component 410 may also communicate, to each document server, an updated list of responsibilities for each document server as the spare serving component 412 will be assigned responsibilities of a failing document server. Alternatively, the managing component 410 may identify that a document distributor is failing and requires replacement.

In other embodiments, a layout change is performed to increase efficiency. A layout, as used herein, refers generally to an organizational structure of a serving system. An exemplary layout is provided in FIG. 4. FIG. 4 indicates that three documents servers 404A, 404B, and 404C are associated with the document distributor 404. A layout is determined based on, among other things, data volume, or a total load of the layout. A total load, as used herein, refers generally to a total number of documents received by a serving system. For example, a total load of a serving system may be six million documents. Total loads may change over time. In an embodiment, a layout is changed to accommodate a changing total load without effecting service.

By way of example only, assume that a total load is six million documents and a document provider indicates a plan to increase the total load by two million documents. In the first layout accommodating six million documents, three index units may be assigned two million documents each. As the total load is increased to eight million documents, the layout may be adjusted.

In an embodiment, the first layout is changed in a series of steps over time such that a second layout is introduced in parallel to the first layout while simultaneously reducing the first layout. This may be accomplished by transferring machines from the first layout to the second layout while simultaneously balancing the load (e.g., queries, documents, etc.) between both the first layout and the second layout. For example, assume that the system 400 of FIG. 4 is the first layout with a load of six million. To accommodate the increased load of eight million, a second layout is created that includes at least one additional index unit than the first layout. In other words, rather than two index units, the second layout includes at least three index units. This allows for an additional index unit to split the load.

In addition to an additional index unit splitting the load, the responsibilities of each index unit are adjusted to reflect the increase in index units. For example, a responsibility of index unit 1 in the first layout may be a responsibility of index unit 4 in the second layout. By introducing the second layout in parallel to the first layout, the newly created index unit 4 may immediately receive data related to its responsibilities rather than the data being filtered through index unit 1. For example, assume that index unit 1 was responsible for documents A-E in the first layout but documents D and E have been reassigned to index unit 4 in the second layout. Index unit 4 is configured to immediately being receiving documents D and E instead of index unit 1 first receiving the documents and transferring them to index unit 4 during the transition of layouts.

In an alternative embodiment, the second layout may be created within the first layout. For example, an additional index unit may be created within the first layout. For a period of time, the data associated with the first layout and the second layout may blur together until the data associated with the first layout expires.

Additional embodiments include indexing and quickly serving the document. Indexing, as used herein, refers generally to storing a mapping of content such as words, numbers, positions, and the like. For instance, when a document is received, each term within the document is identified. The term may then be associated with a position. For instance, the phrase "the bear is sleeping" includes four terms, each with a position within the document. This indexing is important when serving documents as key terms are identified within documents in order to serve documents to a user in response to, for example, a search query input.

Indexing may be organized within a data structure. A data structure is typically built by receiving and indexing documents. The data structure is typically not available for querying while it is being built. Such a delay in availability for querying causes latency between indexing and serving documents. In embodiments, the data structure is queried while it is being built to make documents available for real-time serving. To facilitate such a real-time serving environment, the data structure may be configured to receive new documents as it is simultaneously serving documents. The data structure may be a lock-free data structure, meaning it is capable of adding new documents along with serving documents. In other words, one writer and multiple readers may operate simultaneously to build the data structure while serving documents. The writer may add new documents while the data structure is being queried and the readers may "read" the index within the data structure to identify documents to serve in response to a query.

In embodiments, the readers may see a document only after it has been completely added to the data structure. The document may be received and each term within the document may be identified and indexed along with a location. However, if a search query is received prior to the completion of the indexing, the document is not available to serve. If the document has completed the indexing process, the document is available to serve and the readers would be able to see the document. Such a "cut-off point" allows the data structure to remain lock-free.

By way of example only, assume that document 1 is received and indexed and document 2 is received and is currently being indexed. Also assume that a search query input is received after document 1 has been indexed but prior to completion of the indexing of document 2. The "cut-off point" indicates that document 1 is available for serving but document 2 is not available as it has not completed indexing.

When a document is received, there is no way to know in advance what terms will be included in the document. If the data structure is re-built for each term, the data structure would be huge and system memory would likely be exhausted. In embodiments, the data structure includes a fixed memory with an optimization feature to optimize the memory use. For example, assume that a document is received that includes Term Z. A portion of the memory is allocated to store the position of each occurrence of the Term Z. Term Z may initially be allocated 8 bytes of memory. Now assume that one or more documents have been individually received that also include Term Z. Term Z may be identified as a common term. A common term, as used herein, generally refers to a term that is identified a predetermined number of times. Such identification may trigger the optimization feature to allocate Term Z 16 bytes of memory instead of 8 bytes. The same may be said for a term that is rarely used. A rare term, as used herein, generally refers to a term that identified a number of times that is less than a predetermined threshold. If a rarely used term is assigned more memory than is necessary for that term, the optimization feature may automatically reallocate memory assigned to the rarely used term (e.g., the rarely used term may go from being allocated 8 bytes of memory to 4 bytes of memory). In essence, the optimization feature ensures that memory is not wasted or starved for documents.

In embodiments, each document server is associated with a data structure. As previously explained, the documents servers are each identical. As such, the data structures associated therewith are also identical.

Figure 5:
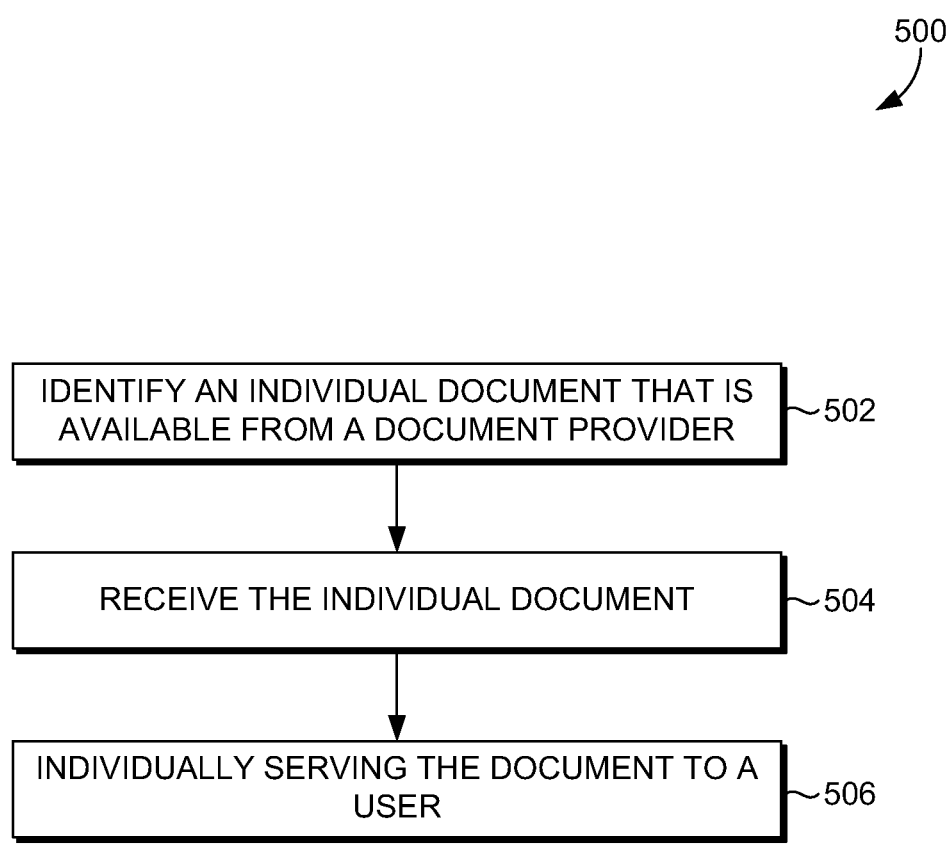
FIG. 5 is a flow diagram showing a first exemplary method 500 for serving documents, in accordance with an embodiment of the present invention.

Turning now to FIG. 5, a flow diagram is provided that illustrates a first exemplary method 500 for serving documents, in accordance with an embodiment of the present invention. Initially, at block 502, one or more documents that are available from a document provider are received. One of the one or more documents is individually served prior to completion of a batching process at block 504.

Figure 6:
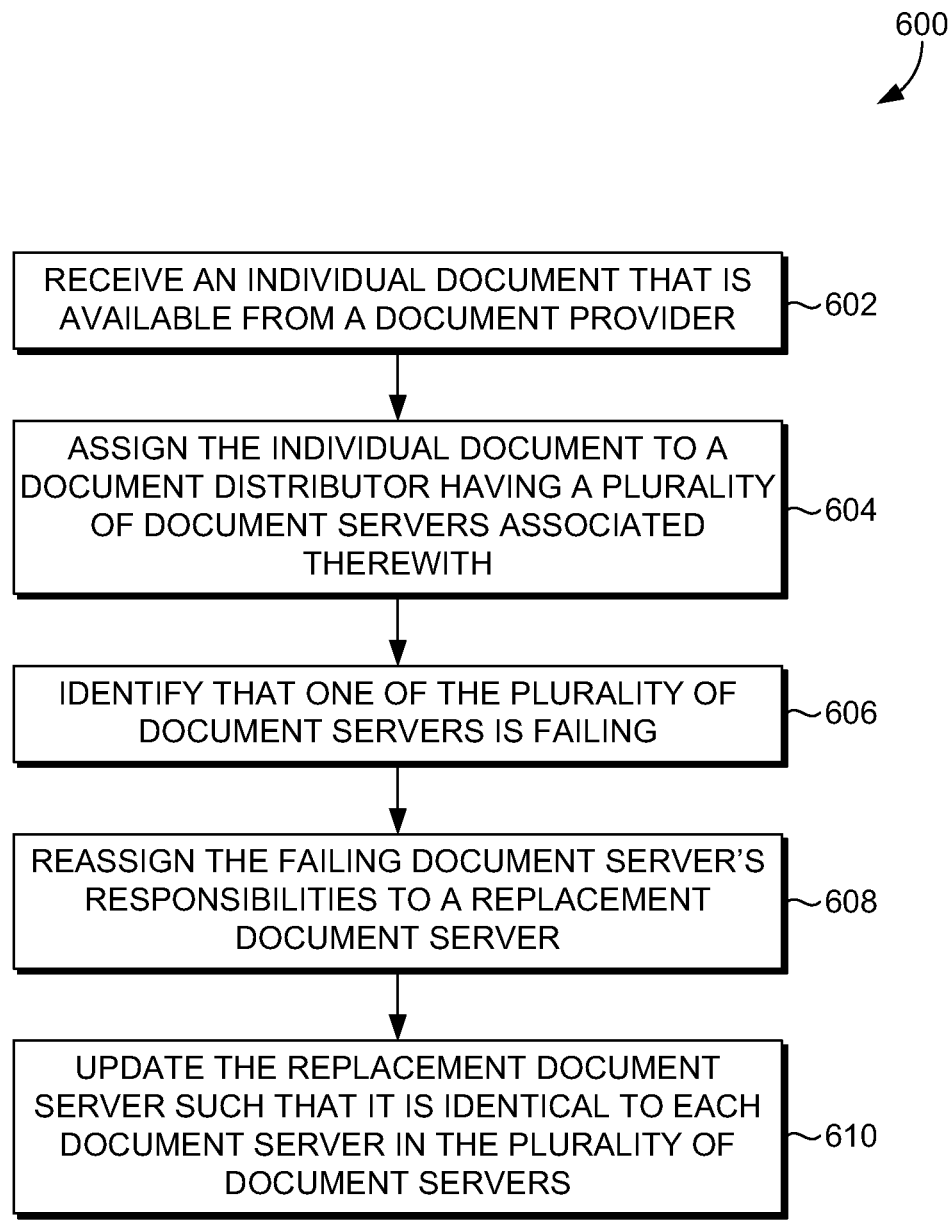
FIG. 6 is a flow diagram showing a second exemplary method 600 for serving documents, in accordance with an embodiment of the present invention.

With reference to FIG. 6, a flow diagram is provided that illustrates a second exemplary method 600 for serving documents, in accordance with an embodiment of the present invention. Initially, at block 602, one or more document is received that are available from a document provider. At block 604, each document is assigned to a document distributor. The document distributor may have a plurality of document servers associated therewith. One of the document servers of the plurality of document servers is identified as failing at block 606 and the failing document server's responsibilities are reassigned to a replacement document server at block 608. At block 610, the replacement document server is updated such that it is identical to each document server in the plurality of document servers.

Figure 7:
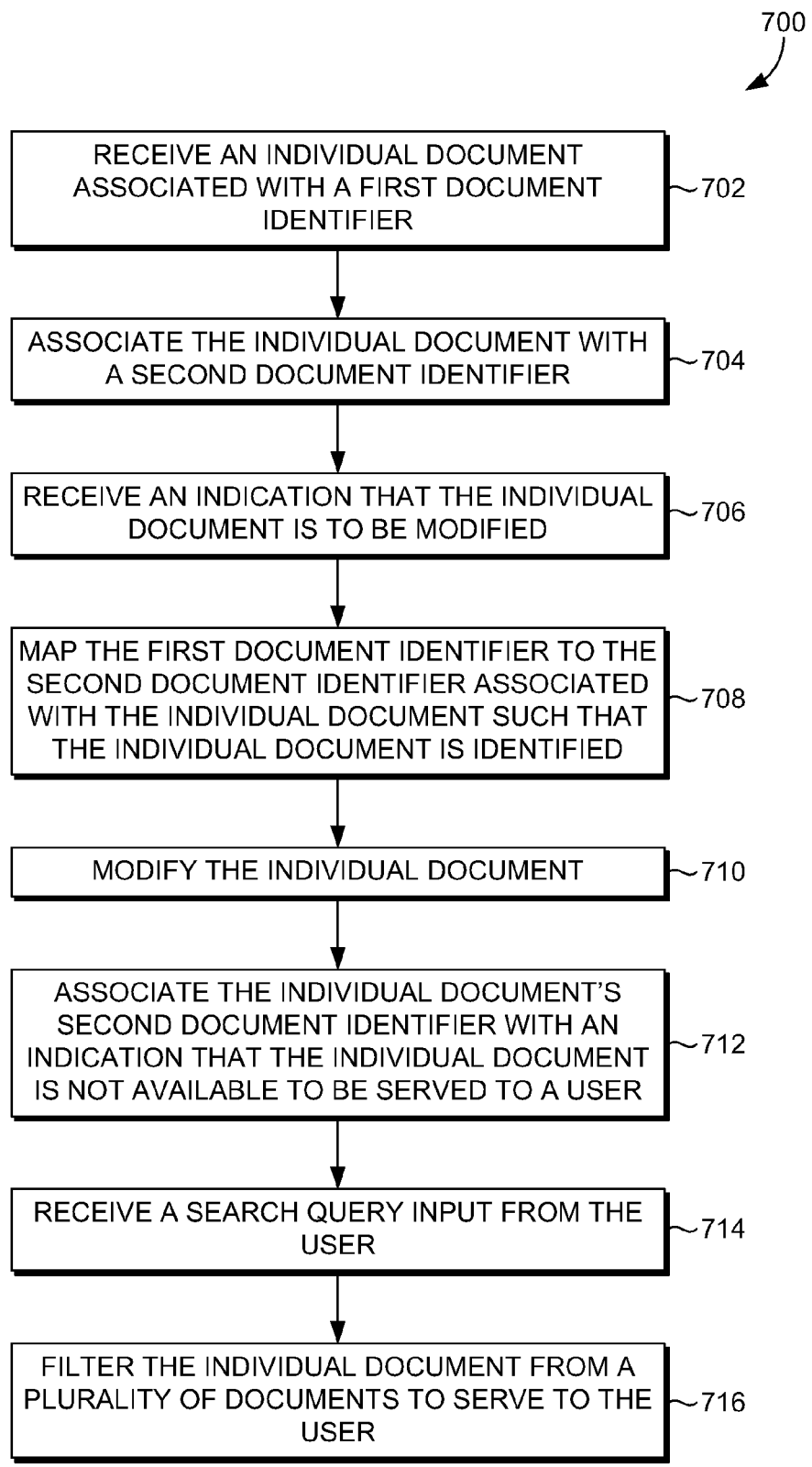
FIG. 7 is a flow diagram showing a third exemplary method 700 for serving documents, in accordance with an embodiment of the present invention.

Turning now to FIG. 7, a flow diagram is provided that illustrates a third exemplary method 700 for serving documents, in accordance with an embodiment of the present invention. As indicated at block 702, a document is received that is associated with a first document identifier. The document is associated with a second document identifier at block 704. An indication is received at block 706 that the document is to be modified. The first document identifier is mapped to the second document identifier such that the document to be modified is identified at block 708. The document is modified at block 710. The document's second document identifier is associated with an indication that the document is not available to be served to a user at block 712. A search query input is received from a user at block 714 and the second document identifier is filtered from a plurality of identifiers associated with documents that are available to serve to the user at block 716.

Figure 8:
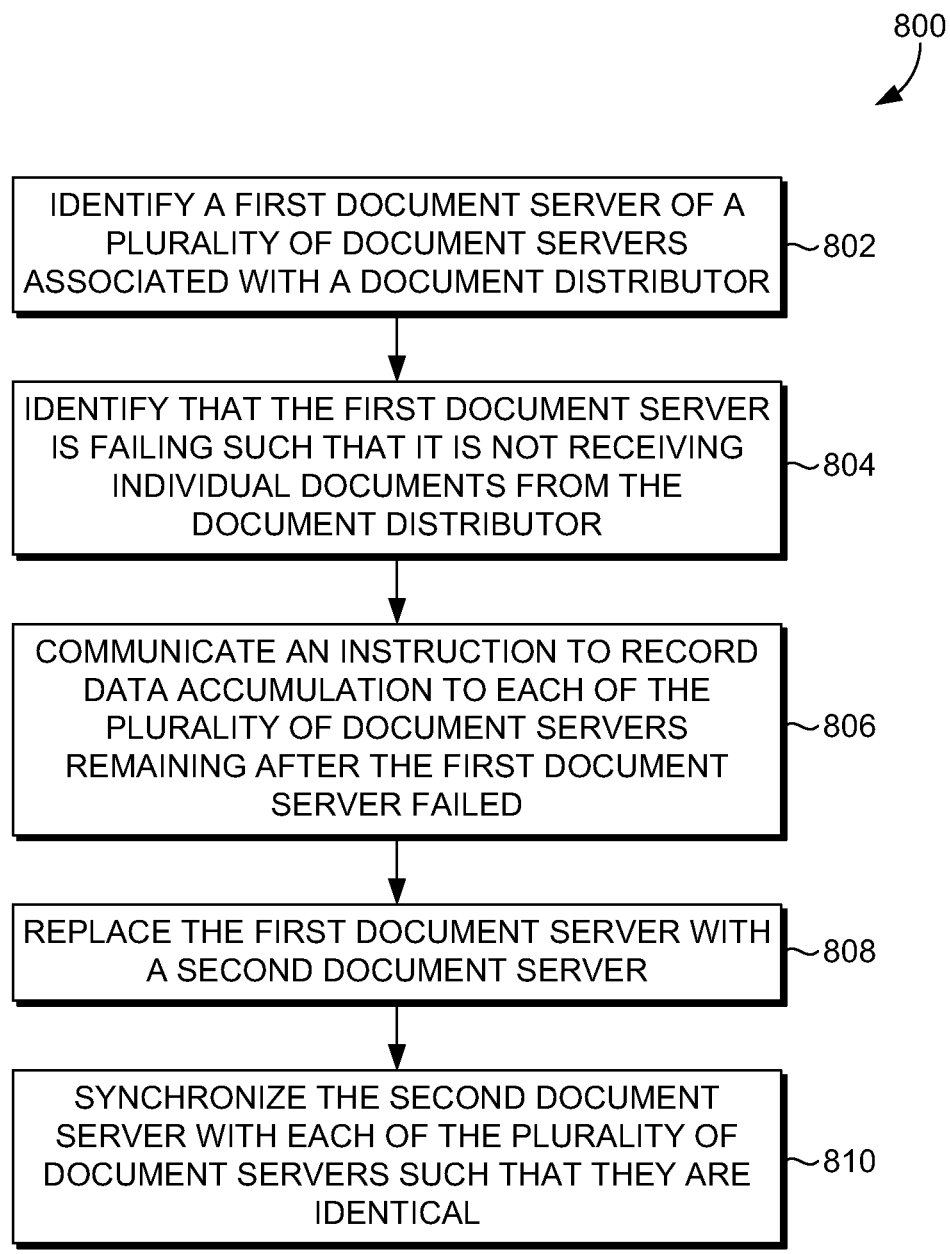
FIG. 8 is a flow diagram showing a fourth exemplary method 800 for serving documents, in accordance with an embodiment of the present invention.

Turning now to FIG. 8, a flow diagram is provided that illustrates a fourth exemplary method 800 for serving documents, in accordance with an embodiment of the present invention. Initially, at block 802, a first document server of a plurality of document servers is identified and associated with a document distributor. The first document server is identified as failing at block 804. An instruction to record data accumulation is communicated to each of the plurality of document servers remaining after the first document server failed at block 806. The first document server is replaced with a second document server at block 808 and is synchronized with each of the remaining document servers at block 810 such that each document server is identical.

Figure 9:
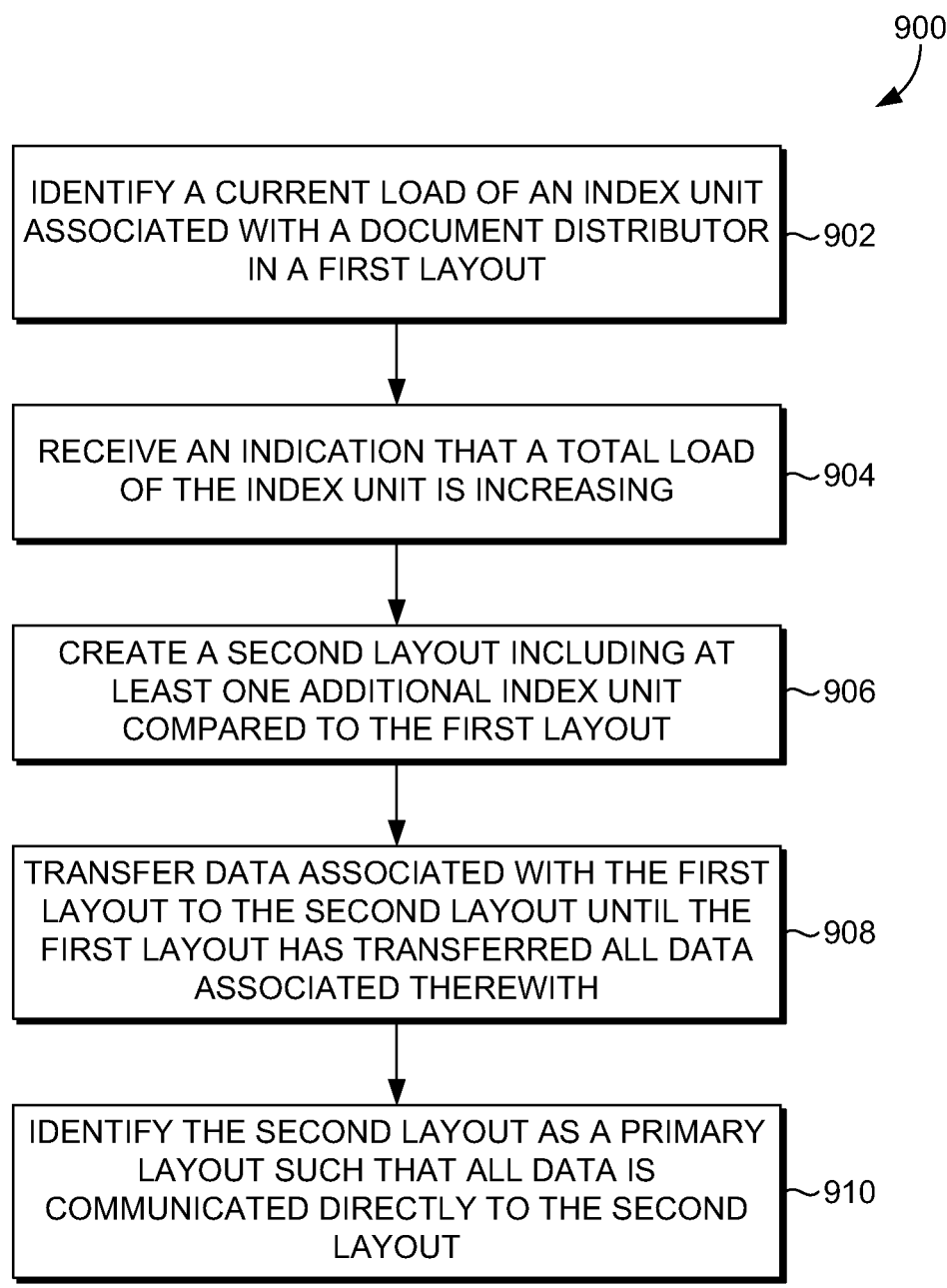
FIG. 9 is a flow diagram showing a fifth exemplary method 900 for serving documents, in accordance with an embodiment of the present invention.

Turning now to FIG. 9, a flow diagram is provided that illustrates a fifth exemplary method 900 for serving documents, in accordance with an embodiment of the present invention. Initially, at block 902, a current load of an index unit associated with a document distributor in a first layout. An indication that a total load of the index unit is increasing is received at block 904. A second layout is created at block 906 that includes at least on additional index unit compared to the first layout. For example, if the first layout includes two index units, the second layout will include at least three index units. At block 908 data is transferred that is associated with the first layout to the second layout until the first layout has transferred all data associated therewith. At block 910, the second layout is identified as a primary layout such that all data is communicated directly to the second layout.

Figure 10:
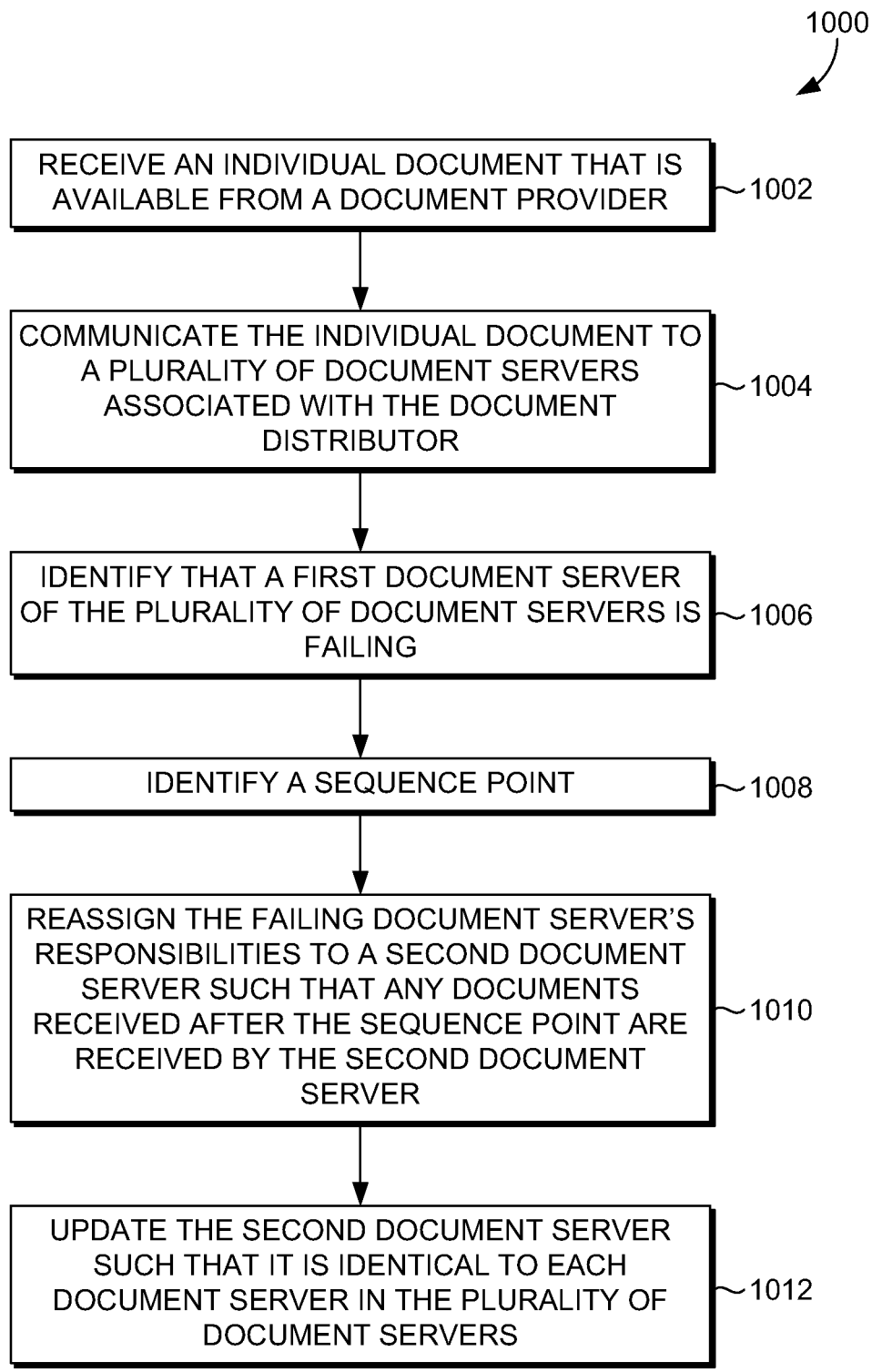
FIG. 10 is a flow diagram showing a sixth exemplary method 1000 for serving documents, in accordance with an embodiment of the present invention.

Turning now to FIG. 10, a flow diagram is provided that illustrates a sixth exemplary method 1000 for serving documents, in accordance with an embodiment of the present invention. Initially, at block 1002, an individual document is received that is available from a document provider. The individual document is communicated to a plurality of document servers associated with a document distributor at block 1004. At block 1006 it is identified that a first document server of the plurality of document servers is failing. A sequence point is identified at block 1008. The failing document server's responsibilities are reassigned to a second document server such that any documents received after the sequence point are received by the second document server at block 1010. At block 1012, the second document server is updated such that it is identical to each document server in the plurality of document servers.

Figure 11:
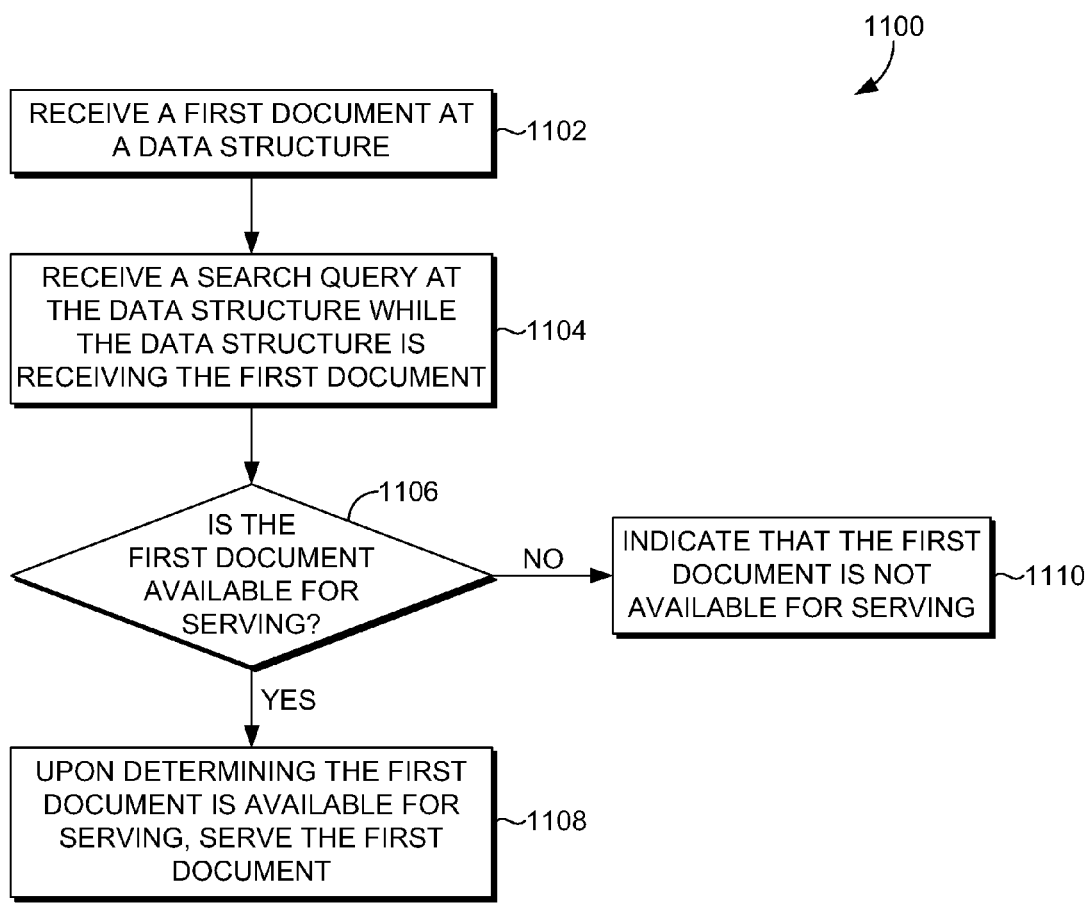
FIG. 11 is a flow diagram showing a seventh exemplary method 1100 for serving documents, in accordance with an embodiment of the present invention.

Turning now to FIG. 11, a flow diagram is provided that illustrates a seventh exemplary method 1100 for serving documents, in accordance with an embodiment of the present invention. Initially, at block 1102, a first document is received at a data structure. A search query is received at block 1104 while the data structure is receiving the first document. At block 1106 a determination is made whether the first document is available for serving. A document is available for serving when the document has completed indexing. Based upon a determination that the first document is available for serving, the first document is served at block 1108. Based upon a determination that the first document is not available for serving, it is indicated that the first document is not available for serving at block 1110.

Figure 12:
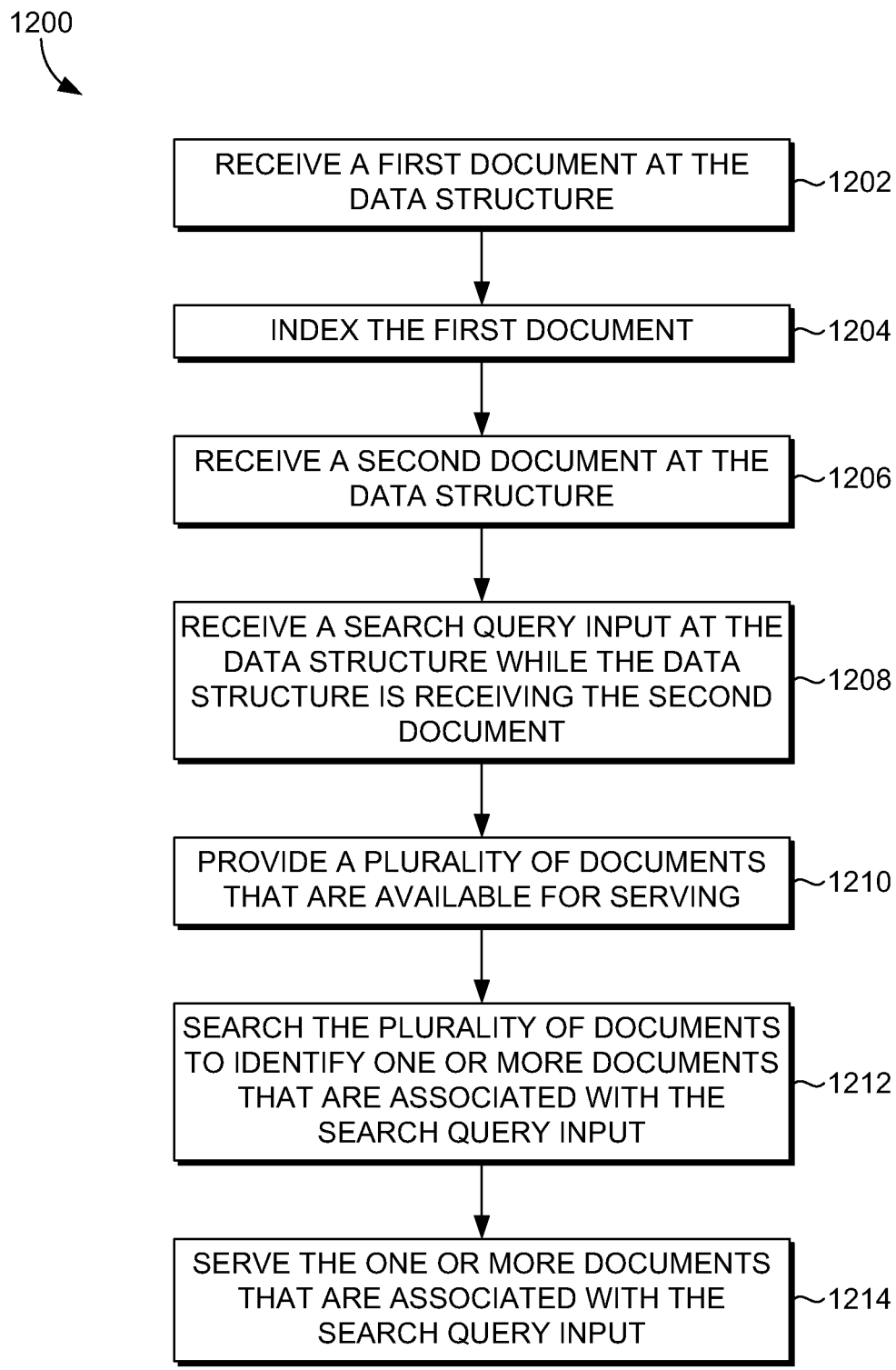
FIG. 12 is a flow diagram showing a eighth exemplary method 1200 for serving documents, in accordance with an embodiment of the present invention.

Turning now to FIG. 12, a flow diagram is provided that illustrates a eighth exemplary method 1200 for serving documents, in accordance with an embodiment of the present invention. Initially, at block 1202, a first document is received and then indexed at block 1204. A second document is received at block 1206. A search query input is received at block 1208 while the second document is being received. A plurality of documents that are available for serving are provided at block 1210. The plurality of documents is searched at block 1212 to identify one or more documents associated with the search query input. At block 1214 the one or more document associated with the search query input are served.

Figure 13:
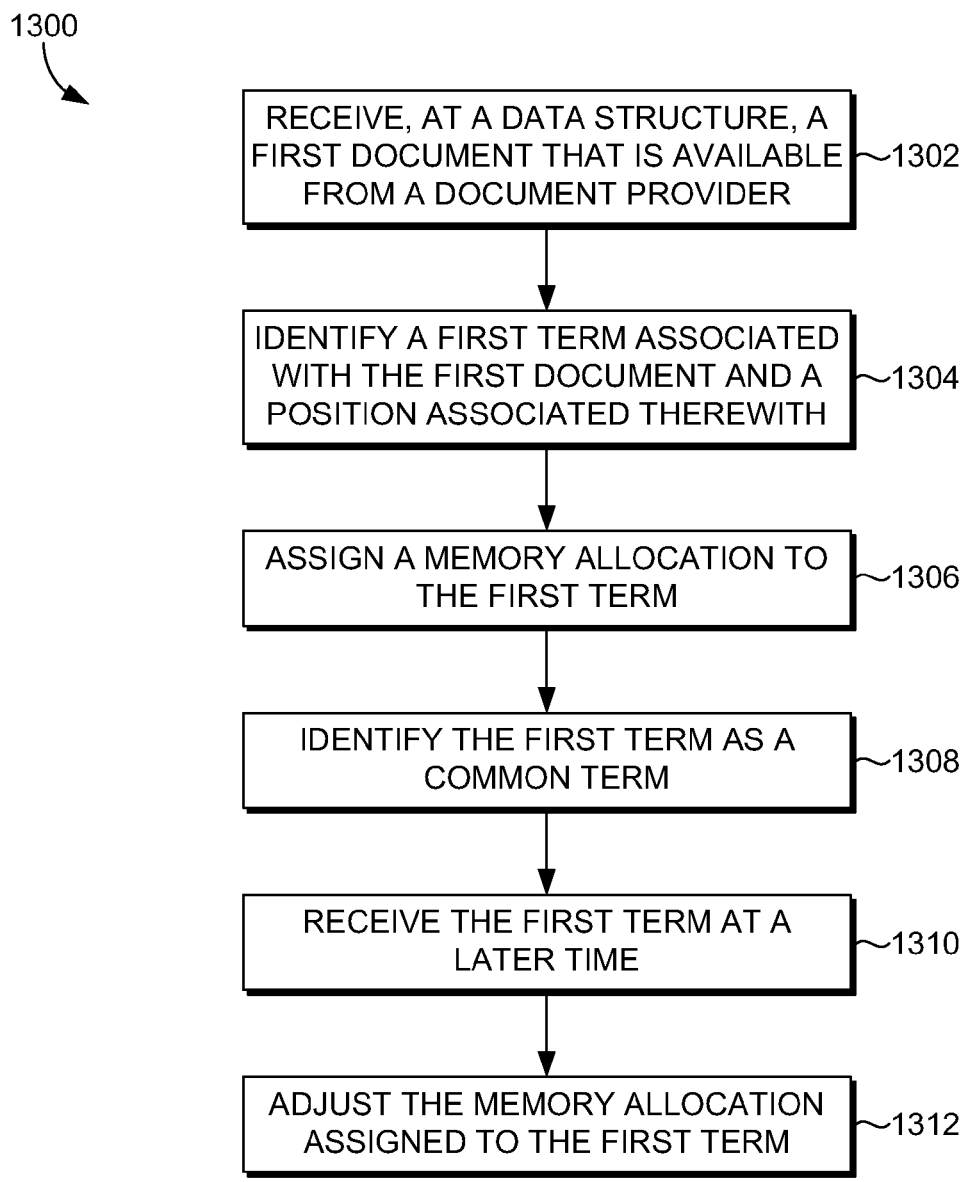
FIG. 13 is a flow diagram showing a ninth exemplary method 1300 for serving documents, in accordance with an embodiment of the present invention.

Turning now to FIG. 13, a flow diagram is provided that illustrates a ninth exemplary method 1300 for serving documents, in accordance with an embodiment of the present invention. Initially, at block 1302, a first document is received that is available from a document provider. A first term is identified at block 1304 that is associated with the first document and a position associated with the first term is also identified. A memory allocated is assigned to the first term at block 1306. The first term is identified as a common term at block 1308. The first term is received at a later time at block 1310 and the memory allocation assigned to the first term is adjusted at block 1312.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 500 of FIG. 5 through method 1300 of FIG. 13 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A system for serving documents, the system comprising:
one or more processors coupled to a computer storage medium, the computer storage medium having stored thereon a plurality of computer software components executable by the processor, the computer software components comprising:
a managing component that:
identifies a first document server of a plurality of document servers associated with a document distributor, wherein the document distributor receives individual documents to communicate to each document server of the plurality of document servers;
identifies that the first document server is failing such that it is not receiving individual documents from the document distributor and the first document server is not individually serving documents to a user prior to a batching process where the individual documents are grouped together;
a recording component that records data accumulation, wherein data accumulation is any data accumulated on the plurality of document servers since the first document server failed;
a replacement component that replaces the first document server with a second document server; and
an updating component that synchronizes the second document server with each of the plurality of document servers such that they are identical.

2. The system of claim 1, wherein individual documents include websites, web pages, and the like.

3. The system of claim 1, further comprising a serving component that serves the individual documents from the second document server once the synchronization is complete.

4. The system of claim 3, wherein the document is served to the user in response to receiving a search query input.

5. The system of claim 1, wherein the recording component records the data accumulation while the system is simultaneously serving documents.

6. The system of claim 1, wherein the second document server was running in the background prior to the failure of the first document server such that data received by the first document server prior to the failure is included on the second document server.

7. The system of claim 1, wherein synchronizing the second document server with each of the plurality of document servers includes identifying which document server of the plurality of document servers includes data received subsequent to the failure of the first document server.

8. The system of claim 7, wherein the updating component is further configured to synchronize the second document server with each of the plurality of document servers by:

accessing various portions of the data received subsequent to the failure of the first document server from various document servers of the plurality of document servers; and copying the data received subsequent to the failure of the first document server to the second document server.

9. The system of claim 1, wherein the second document server receives individual documents from the document distributor upon replacing the first document server.

10. One or more computer storage media devices, having computer-executable instructions embodied thereon that, when executed by a computing system having a processor and a memory perform a method, the method comprising:

identifying a current load of an index unit associated with a document distributor in a first layout, wherein the current load of the index unit is a number of individual documents received by the index unit, and wherein the index unit includes one or more document servers associated with the document distributor where the one or more documents servers individually serve individual documents;

receiving an indication that a total load of the index unit is increasing;

creating a second layout including at least one additional index unit compared to the first layout;

transferring data associated with the first layout to the second layout until the first layout has transferred all data associated therewith while simultaneously balancing a load between the first layout and the second layout; and identifying the second layout as a primary layout such that all data is communicated directly to the second layout.

11. The one or more computer-storage media devices of claim 10, further comprising removing the first layout.

12. The one or more computer-storage media devices of claim 10, further comprising balancing the total load of both the first layout and the second layout and a total number of documents served from both the first layout and the second layout.

13. The one or more computer-storage media devices of claim 10, wherein an increase of the total load of the index unit is when a number of individual documents received by the index unit is increased.

14. The one or more computer-storage media devices of claim 13, further comprising reallocating responsibilities of the index unit to compensate for the at least one additional index unit in the second layout.

15. The one or more computer-storage media devices of claim 14, wherein reallocation of responsibilities allows for data to be communicated directly to the at least one additional index unit.

16. A method for serving documents, the method comprising:

receiving, at a document distributor, an individual document that is available from a document provider, wherein the document is any web document;

communicating the individual document to a plurality of document servers associated with the document distributor, wherein the plurality of document servers receive documents only from the associated document distributor;

identifying, by a computing device having a processor and a memory, that a first document server of the plurality of document servers is failing and is not individually serving documents to a user prior to a batching process where the individual documents are grouped together;

identifying a sequence point, where the sequence point is a time at which the first document server failed and was no longer receiving documents;

reassigning the failing document server's responsibilities to a second document server such that any documents received after the sequence point are received by the second document server; and updating the second document server such that it is identical to each document server in the plurality of document servers.

17. The method of claim 16, wherein updating the second document server includes copying data prior to the sequence point from each of the remaining document servers of the plurality of document servers to the second document server.

18. The method of claim 16, further comprising communicating a notification to each of the remaining document servers of the plurality of document servers indicating that each document server should record data accumulation.

19. The method of claim 18, wherein data accumulation is any data received by the plurality of document servers subsequent to the sequence point.

20. The method of claim 16, wherein serving documents from the second document server once the second document server is updated and identical to each other document server within the plurality of document servers.

* * * * *